(12) United States Patent
Bonifacio Hauffe et al.

(10) Patent No.: US 8,449,788 B2
(45) Date of Patent: May 28, 2013

(54) LEATHER FINISHING COMPOSITIONS COMPRISING DIOXOLANE DERIVATIVES

(75) Inventors: Daniela Bonifacio Hauffe, Paulinia (BR); Jose Denilson Vicentim, Campinas (BR); Paulo Roberto Garbelotto, Caminas (BR)

(73) Assignee: Rhodia Poliamida e Especialidades Ltda, Sao Paulo (BR)

( * ) Notice: Subject to any disclaimer, the term of this patent is extended or adjusted under 35 U.S.C. 154(b) by 0 days.

(21) Appl. No.: 13/394,328

(22) PCT Filed: Aug. 31, 2010

(86) PCT No.: PCT/IB2010/002154
§ 371 (c)(1),
(2), (4) Date: May 18, 2012

(87) PCT Pub. No.: WO2011/027205
PCT Pub. Date: Mar. 10, 2011

(65) Prior Publication Data
US 2012/0223268 A1 Sep. 6, 2012

(30) Foreign Application Priority Data

Sep. 3, 2009 (FR) ..................... 09 56007

(51) Int. Cl.
*C14C 11/00* (2006.01)
*B05D 7/12* (2006.01)
*C09D 101/14* (2006.01)
*C09D 101/18* (2006.01)

(52) U.S. Cl.
USPC .......................................... 252/8.57; 427/389

(58) Field of Classification Search
USPC .......................................... 252/8.57; 427/389
See application file for complete search history.

(56) References Cited

U.S. PATENT DOCUMENTS

| | | | |
|---|---|---|---|
| 3,055,766 A | | 9/1962 | Reinhardt |
| 3,830,920 A | * | 8/1974 | Morrison et al. ............. 514/305 |
| 4,575,558 A | * | 3/1986 | Mai et al. ..................... 549/453 |
| 2010/0137480 A1 | | 6/2010 | Denilson et al. |

FOREIGN PATENT DOCUMENTS

| | | |
|---|---|---|
| BE | 595703 | 10/1960 |
| EP | 0927200 | 4/2009 |
| FR | 2912149 | 8/2008 |
| WO | WO 98/12233 | 3/1998 |

OTHER PUBLICATIONS

International Search Report, dated Jan. 20, 2011 in related PCT Application No. PCT/IB2010/002154, filed on Aug. 31, 2010.

* cited by examiner

*Primary Examiner* — Anthony J Green
(74) *Attorney, Agent, or Firm* — Dentons US LLP

(57) ABSTRACT

Uses of dioxolane derivatives in the finishing of leather are described. Also described, are leather finishing compositions comprising dioxolane derivatives and methods for treating leather.

16 Claims, No Drawings

LEATHER FINISHING COMPOSITIONS COMPRISING DIOXOLANE DERIVATIVES

CROSS REFERENCE TO RELATED APPLICATIONS

The present application claims the benefit of PCT International Application No. PCT/IB2010/002154 filed Aug. 31, 2010, which claims the benefit of French Application Serial No. 0956007 filed Sep. 3, 2009; each of which are incorporated herein by reference in their entireties.

The present invention relates to novel uses for dioxolane derivatives in leather finishing, as well as leather finishing compositions comprising dioxolane derivatives, and a process to treat leather.

BACKGROUND OF THE INVENTION

Tanning is a chemical process, via tannin, for converting skins to leather by making them more durable and more flexible. In leather technology, the functions of the finishing step encompass color leveling, brightness control, as well as providing a protective surface with good resistance to water, chemical attack and abrasion. In this step, the leather will acquire specific properties, particularly in terms of its texture and its appearance. These properties will allow standardization of the leathers obtained from production. Certain compounds act as leveling agents, penetrating agents and dye solubilization aids.

As to the finishing process, typically a layer called a base coating on the leather is first applied. The adhesion of the first layer to the substrate (leather) is very important to the finishing.

Then a second coating is applied, which is harder than the base coating and contains polymer dispersions, for example polyacrylates, and pigments, optionally water-based. This layer is very important with respect to color and thickness of the finishing. Pigments for the coloring and the finishing of leather are, in most cases, inorganic, but organic pigments can also be used. It is intended that this formulation forms a stronger and resistant film when compared to the base coat. After applying the second coating, the leather is usually ironed.

The third coating layer may be a solution of nitrocellulose-based solvent, an emulsion of nitrocellulose or a water-based polyurethane, and generally does not contain pigments. Its content of solids is approximately 10%. This upper layer determines the final properties of leather: it must be as hard and compact as possible to create the desired resistance to friction and so soft as to bend and move quickly without breaking. The third coating layer is probably the most important because it is responsible for the appearance and texture of the leather, in addition to providing resistance against mechanical influences, water and dust. The underlying layers act as a bridge between the structure and the leather surface. The polymers most used in the finishing process are polyacrylates, polybutadiene, and polyurethane. They are generally applied by spray or by a casting process.

There are many known organic solvents that are used in the finishing of leather. Table I below shows the function of some of these solvents.

| Family | Products | Key Applications |
|---|---|---|
| Alcohols | Isopentanol Isobutylic alcohol Sec-butanol | Co-solvent formulations for leather finishing |
| Acetates of alcohols and glycol ethers | Isopentyl acetate Ethylglycol acetate Butylglycol acetate | Active solvents of medium and low evaporation for finishing leather dyes and soles |
| Ketones | Methyl ethyl ketone | Light active solvent for formulations of leather, paints and soles |
| Glycol ethers | Ethylglycol Butylglycol | Penetrating agent for leather finishing |

Among the solvents mentioned above, three have a slower rate of evaporation: ethylglycol acetate, butylglycol acetate and butylglycol, and therefore, they are the last solvent evaporated in the formulations. These solvents evaporate slowly to ensure that the finishing is well leveled and that the film is formed before the system is completely dried.

As mentioned in Table 1, the butylglycol is used as a penetrating agent, which aims to accelerate the penetration of ink on the substrate. Thus this solvent gives better penetration of ink and consequent improvement of adhesion to the substrate.

The known solvents used in the finishing of leather should, apart from solubilizing the resins, also dilute pigments and dyes. There are several types of finishing that are classified according to the dye used, for example, aniline. This maintains the transparency and all visual properties of leather, such as pores, staining, scratch healing and parasite marks. The semi-aniline finishing uses resins, lacquers and auxiliaries for the leather surface resistance. However, in this case a combination of pigments and metal-complex is prepared to disguise defects such as marks from parasites.

The metal-complex dyes are usually solubilized by solvents such as ethylglycol, butylglycol and ethanol. Currently, good solvency power solvents for aniline-metal complexes have been identified.

In the market for leather finishing, there are three disadvantages of using solvent-based formulations: the strong odor, flammability, and health risks that these products may cause. Thus, there is a recognized need for new solvents and formulations that are less aggressive on the health and also less dangerous with respect to explosions.

From now on there are also rules on limiting emissions of volatile organic compounds due to the use of organic solvents in certain activities and installations. These rules have a direct impact on the use of volatile organic compounds in tannery finishing processes, where the consumption of organic solvent is substantial.

DESCRIPTION OF THE INVENTION

A novel use for certain dioxolanes was surprisingly detected, with advantages over the existing solvents and agents for the leather finishing composition components known in the prior art, or at least as important technical alternatives to them.

The present invention accordingly first provides a leather finishing composition comprising at least one dioxolane derivative of formula I. The invention also relates to the use of dioxolane derivatives of formula I in leather finishing compositions. The dioxolane derivatives of formula I are preferably used in the second or third coating layer of the leather finishing steps.

The invention also relates to the use of dioxolane derivatives of formula I as a penetration agent in leather finishing compositions.

The invention also relates to a leather treatment process comprising at least one step in which the leather finishing composition of the invention is applied to the surface of the leather being treated.

The dioxolanes of this invention are according to formula I below:

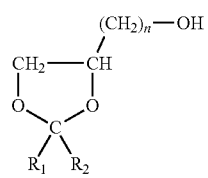

where
$R_1$ and $R_2$ are the same or different, selected among hydrogen, alkyl, alkenyl and phenyl, n being an entire number from 1 to 5.

In a particular embodiment $R_1$ and $R_2$ are methyl, ethyl, n-propyl or isobutyl. Also particularly n is either 1 or 2.

In another particular embodiment, the dioxolane derivative is 2,2-dimethyl-1,3-dioxolane-4-methanol, known as solketal (CAS Registry number 100-79-8). In the following solketal is mentioned only as a representative example of the dioxolane derivatives of the invention, and does not in any way limit the scope of the invention to only this sole compound.

Butylglycol is a known and widely used solvent in the leather finishing field, and is here used as a comparison parameter for solketal in leather finishing compositions. Selected data on these two solvents can be seen in Table 2 below.

TABLE 2

Physicochemical properties of solvents butylglycol and solketal

| Property | Butylglycol | Solketal |
|---|---|---|
| TER | 6.80 | 2.70 |
| Density g/ml 20° C. | 0.90 | 1.07 |
| Solubility in water at 20° C. | miscible | miscible |
| MIR g $O_3$/g of compound | 2.79 | 2.01 |
| Biodegradability | readily | Under slight acidic conditions |
| LD50 (oral/mouse mg/kg) | 1480 | 7000 |
| Boiling Point (° C.) | 171 | 182-185 |
| Flash Point (° C.) | 62 | 91 (closed cup) |
| Hygroscopicity | yes | yes |
| Acute oral toxicity | 1.95 | 7.00 |
| Aquatic toxicity mg/ml | 1.72 | >1.00 |
| Viscosity cPa 25° C. | 2.9 | 11.0 |
| Skin irritation | moderate | moderate |
| Eye irritation | severe | severe |
| Vapor pressure | 0.8 | 70 |
| Odor | odor of ether | low |

As butylglycol, solketal is a solvent that has a relative low evaporation rate (TER) and therefore is one of the last solvents to evaporate in a formulation of ink. Furthermore, it has a flash point higher than the butylglycol, offering no risk of explosion and hence is easier to handle and to transport.

Solketal can be considered less toxic than butylglycol, according the acute oral toxicity LD50 (oral/mouse). Another positive factor of solketal is that its odor is much lower than the butylglycol hence its use in leather industry is more acceptable.

For other health risks such as damage to skin and eyes, the behavior of both solvents is similar. The two solvents are hygroscopic and have almost 100% solubility in water at 20° C.

In terms of biodegradability, in a slightly acid pH solketal may revert into acetone and glycerin, which are biodegradable compounds.

Another advantage of solketal, is that it has an MIR (Maximum Incremental Reactivity) value lower than butylglycol and is thus less aggressive to the environment in terms of VOC (volatile organic compounds).

The compositions may optionally comprise other organic solvents, such as, for example, those selected from the group consisting of the following: esters, glycol ethers, alcohols, ketones, and aromatic hydrocarbons. In this context, mention may be made of isopropyl acetate, isopentyl acetate, n-butyl acetate, ethyl acetate, n-propyl acetate, n-amyl acetate, 2-ethoxyethanol, isopropanol, 2-butoxyethanol, 2-ethoxyethyl acetate, 2-butoxyethyl acetate, 1-methoxy-2-propanol, 1-methoxy-2-propyl acetate, ethylglycol acetate, butylglycol acetate, methyl alcohol, ethyl alcohol, n-propyl alcohol, isopropyl alcohol, n-butyl alcohol, isobutyl alcohol, sec-butanol, diacetone alcohol, acetone, methyl ethyl ketone, methyl isobutyl ketone, cyclohexanone, diisobutyl ketone, xylene and toluene.

The finishing compositions may comprise components that are conventionally used in the field, such as binders, colorants, auxiliary agents, varnishes, carriers and biocides.

A binder is the main constituent in the formation of a leather finishing film. It binds the pigments and other substances jointly and, by virtue of its adhesive properties, causes the film to adhere to the leather. Proteinaceous binders are generally composed of preparations based on albumin and casein. They may also contain additives such as waxes and gum lac. They are available in powder form and may be dissolved in sodium hydroxide, aqueous ammonia or borax. The proteinaceous binders use plasticizers, such as sulfated castor oil or polyethylene glycol.

Resin emulsions are the binders most commonly used in tanneries. They generally comprise polyacrylates, butadienes, polyurethanes or vinyl acetates. The resins are water-based emulsions.

The colorants comprise dyes and pigments. Dyes are used in finishing formulations for a particular application. The dyes used in finishing are in liquid form and are generally pre-metalized dyes.

Pigments constitute the major portion of the colorants used in leather finishing. The main types of pigments are organic pigments and inorganic pigments. The inorganic pigments are, for example, iron oxides, titanium dioxide and carbon black, but also heavy metal compounds, for example lead chromate, lead molybdate and cadmium sulfate.

The dyes used in tanneries may be placed into two classes: anionic dyes and cationic dyes. The leather industry often uses anionic dyes, which may be placed in the following classes: acid dyes, direct dyes, mordant dyes, pre-metalized dyes, and solubilized sulfur dies.

From a chemical standpoint, the dyes are generally azo dyes or anthraquinone dyes.

Metal-complex dyes are generally used and are composed of a central metal ion and one or two azo dye ligands. The central ion may be iron, chromium, nickel, copper and cobalt.

During the dyeing operation, wetting agents, leveling agents, whitening agents, shade intensifiers, post-treatment agents and fixing agents may be applied. All of these products have different effects on the dye and on the leather. Some of them will facilitate the absorption of the dye, while others will facilitate its penetration. Certain products allow the light stability of the fabricated leathers to be enhanced.

Numerous auxiliary agents can be used. For the dispersion of the pigments various organic solvents and/or surfactants may be added. The preparation may further comprise waxes, vegetable mucilages, cellulose products or polymers as protective colloids, natural or synthetic oils as flexibilizing agents. For obtaining special properties, etching agents, grain adhesion agents, penetrating agents, anti-sticking agents, thickening agents and stabilizers, plasticizing agents (phthalates), dulling agents and fixing agents are applied.

The varnishes or varnish emulsions form the upper layer or fixing layer of a finish. The varnishes are generally produced by dissolving nitrocellulose in solvents, for example ethyl acetate, methoxypropanol, methylisobutyl ketone. These solutions may be emulsified with water and surfactants to give varnish emulsions. Polyurethane varnishes are also used.

The leather finishing composition of the invention preferably comprises a resin based on a cellulose derivative, such as on cellulose acetobutyrate or nitrocellulose.

The carriers are used to produce suspensions/dispersions of binders in the finishing formulations. Water and organic solvents are considered to be carriers. The organic solvents used may be classed into two categories: solvents, which actually dissolve the binders, such as, for example, ethyl acetate, and diluents, which allow the existing solution to be diluted in order to have a certain spray viscosity or the desired concentration, such as, for example, methoxypropanol and isopropyl alcohol.

Biocides may be applied in various tanning operations for the purpose of protecting the substrate from bacterial or fungal attack. Generally speaking, the biocides are included in the majority of liquid chemical formulations, such as dyes, nourishing oils and finishes based on casein. The biocides may be bactericides or fungicides.

There is a wide range of methods for applying finishing compositions, such as fluffing, spray coating, curtain coating, roller coating or transfer application.

A specific language is used in the description in order to aid comprehension of the principle of the invention. It should nevertheless be understood that no limitation on the scope of the invention is intended by the use of this specific language. Modifications, improvements and refinements may in particular be envisaged by a person skilled in the relevant technical field, on the basis of his or her own general knowledge.

The term "and/or" includes the meanings "and", "or", and also all the other possible combinations of the elements connected to this term.

Other details or advantages of the invention will emerge more clearly in the light of the examples given below solely by way of indication.

EXAMPLES

In the examples below, it must be taken into account that solketal presents advantages, used alone or partially replacing other solvents, because of its qualities of lower flammability, lower toxicity and the lower odor compared to those solvents commonly used in industry Example 1

Penetrating Agent

Solketal was tested in the formulation as penetrating agents, replacing glycols such as ethylglycol and butylglycol acetate.

Performance was similar to the original system formulation with no disadvantages. A great advantage is minimal odor compared to other solvents.

Impregnation tests simulation showed no problems of penetration in leather with multi-point application.

In the use with dye for tincture, when the finish is still wet, solketal slightly erases the color of ink. But when the finishing is completely dry, no visible change in color was detected. There was no change detected in the speed of penetration of the ink on the substrate.

Laboratory tests were performed considering two commercially available formulations with nitrocellulose lacquer and cellulose acetobutyrate, a solvent base and an emulsion.

Comparative results are shown in Tables 3 and 4.

TABLE 3

Cellulose acetobutyrate, Emulsion

| | Emulsion Formulation | | |
|---|---|---|---|
| | Original (%) | Test 1 (% w/w) | Test 2 (% w/w) |
| Composition | | | |
| Cellulose acetobutyrate resin | 9 | 9 | 9 |
| Ketone solvent | 32 | 49 | 51 |
| Butylglycol acetate | 59 | 0 | 0 |
| Solketal | 0 | 42 | 40 |
| | 100.0 | 100.0 | 100.0 |
| Final Results | | | |
| Viscosity (s) | 33 | 20 | 16 |
| pH (10%) | 7.8 | 7.5 | 7.7 |
| Solubility in water | Very good | Very good | Very good |
| Leveling in leather | Good | Good | Good |
| Dry Friction—200 cycles | 4.5-5.0 | 4.5-5.0 | 4.5-5.0 |
| Wet Friction—100 cycles | 1.0-1.5 | 1.0-1.5 | 1.0-1.5 |

TABLE 4

Nitrocellulose Emulsion

| | Emulsion Formulation | |
|---|---|---|
| | Original (%) | Test 1 (% w/w) |
| Composition | | |
| Nitrocellulose resin | 8 | 8 |
| Ketone solvent | 41 | 61 |
| Butylglycol acetate | 51 | 0 |
| Solketal | 0 | 31 |
| | 100.0 | 100.0 |
| Final Results | | |
| Leveling in leather | Good | Good |

TABLE 4-continued

| Nitrocellulose Emulsion | | |
|---|---|---|
| | Emulsion Formulation | |
| | Original (%) | Test 1 (% w/w) |
| Dry Friction—200 cycles | 4.5-5.0 | 4.5-5.0 |
| Wet Friction—100 cycles | 4.5-5.0 | 4.5-5.0 |

The following advantages relating to the use of the dioxolane derivatives of the invention are pointed out in view of the comparative results above:
  Higher fluidity of formulations in the formulations of Table 3
  Low toxicity of solketal
  Roughly the same performance with a lower proportion of solketal

Example 2

Dye Solvent

Solketal was tested to solubilize a dye-metal complex. Performance was good compared to diacetone alcohol and methoxy propanol, and less effective compared to ethyldiglycol, ethylglycol, butyldiglycol and butylglycol.

This shows that performance of solketal as solvent for metallic colors is average, for example when this solvent is used in place of butylglycol and butyldiglycol by replacing them entirely. However, if solketal is used in conjunction with other solvents, to take advantage of its properties, overall performance increases. Solketal is therefore acceptable for use in formulations for leather finishing as a dye solvent.

The main advantage of using solketal is that the solvent has a low odor and is not characterized as a flammable substance, besides being more ecologically important because of its low MIR value. Thus, the substitution of other glycols by solketal, not known until now, is encompassed by the invention.

It is well understood that, with the aid of the teachings and examples given herein, the person skilled in the art is capable of performing equivalent embodiments of the invention that, although not expressly described, perform substantially the same function to reach substantially the same results, which is also encompassed by the terms of the claims presented further on.

The invention claimed is:

1. A process for increasing penetration of leather finishing compositions into leather, said process comprising applying a leather finishing composition to a surface of the leather being treated, wherein the leather finishing composition comprises a dioxolane of formula I

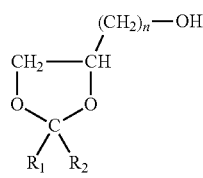

where $R_1$ and $R_2$ which are the same or different, are selected from the group consisting of hydrogen, alkyl, alkenyl, and phenyl, and n is an integer from 1 to 5.

2. The process according to claim 1, wherein in formula I, $R_1$ and $R_2$ are selected from the group consisting of methyl, ethyl, n-propyl, and isobutyl.

3. The process according to claim 1, wherein in formula I, n is 1 or 2.

4. The process according to claim 1, wherein the dioxolane is 2,2-dimethyl-1,3-dioxolane-4-methanol.

5. The process according to claim 1, wherein the leather finishing composition further comprises at least one constituent selected from the group consisting of binders, colorants, auxiliary agents, varnishes, carriers, and biocides.

6. The process according to claim 1, wherein the leather finishing composition further comprises at least one organic solvent selected from the group consisting esters, glycol ethers, alcohols, ketones, and aromatic hydrocarbons.

7. The process according to claim 1, wherein the leather finishing composition further comprises a resin based on cellulose.

8. The process according to claim 7, wherein the resin based on cellulose is cellulose acetobutyrate or nitrocellulose.

9. A process for treating leather, the process comprising applying a leather finishing composition to the surface of the leather being treated, wherein the leather finishing composition comprises a dioxolane of formula I

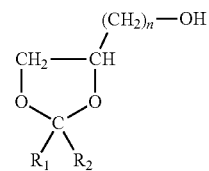

where $R_1$ and $R_2$ which are the same or different, are selected from the group consisting of hydrogen, alkyl, alkenyl, and phenyl, and n is an integer from 1 to 5.

10. The process according to claim 9, wherein in formula I, $R_1$ and $R_2$ are selected from the group consisting of methyl, ethyl, n-propyl, and isobutyl.

11. The process according to claim 9, wherein in formula I, n is 1 or 2.

12. The process according to claim 9, wherein the dioxolane is 2,2-dimethyl-1,3-dioxolane-4-methanol.

13. The process according to claim 9, wherein the leather finishing composition further comprises at least one constituent selected from the group consisting of binders, colorants, auxiliary agents, varnishes, carriers, and biocides.

14. The process according to claim 9, wherein the leather finishing composition further comprises at least one organic solvent selected from the group consisting esters, glycol ethers, alcohols, ketones, and aromatic hydrocarbons.

15. The process according to claim 9, wherein the leather finishing composition further comprises a resin based on cellulose.

16. The process according to claim 15, wherein the resin based on cellulose is cellulose acetobutyrate or nitrocellulose.

* * * * *